US009631104B2

(12) United States Patent
Adamic

(10) Patent No.: US 9,631,104 B2
(45) Date of Patent: Apr. 25, 2017

(54) ORTHOGONAL NON-NEWTONIAN INKJET INKS

(71) Applicant: Hewlett-Packard Development Company, L.P., Fort Collins, CO (US)

(72) Inventor: Raymond Adamic, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/119,026

(22) PCT Filed: Mar. 6, 2014

(86) PCT No.: PCT/US2014/021324

§ 371 (c)(1),
(2) Date: Aug. 15, 2016

(87) PCT Pub. No.: WO2015/134029

PCT Pub. Date: Sep. 11, 2015

(65) Prior Publication Data

US 2016/0362573 A1 Dec. 15, 2016

(51) Int. Cl.

*G01D 11/00* (2006.01)
*B41J 2/17* (2006.01)
*C09D 11/00* (2014.01)
*C09D 11/38* (2014.01)
*C09D 11/322* (2014.01)
*B41J 2/01* (2006.01)
*C09D 11/36* (2014.01)

(52) U.S. Cl.

CPC ................. *C09D 11/38* (2013.01); *B41J 2/01* (2013.01); *C09D 11/322* (2013.01); *C09D 11/36* (2013.01)

(58) Field of Classification Search

CPC .......... B41J 2/2107; B41J 2/01; B41J 2/5052; C09D 11/322; C09D 11/34; C09D 11/30; C09D 11/38; C09D 11/40; C09D 11/02; C09D 11/36

USPC ........................................ 347/100; 106/31.13

See application file for complete search history.

(56) References Cited

U.S. PATENT DOCUMENTS

| | | | |
|---|---|---|---|
| 4,591,612 | A | 5/1986 | Quinn |
| 5,663,217 | A | 9/1997 | Kruse |
| 6,467,897 | B1 | 10/2002 | Wu et al. |
| 7,320,727 | B2 | 1/2008 | Jou et al. |
| 7,563,314 | B2 | 7/2009 | Breton et al. |
| 7,943,681 | B2 | 5/2011 | Lee et al. |

(Continued)

OTHER PUBLICATIONS

International Search Report dated Dec. 3, 2014 for PCT/US2014/021324, Applicant Hewlett-Packard Development Company, L.P.

*Primary Examiner* — Jannelle M Lebron

(74) *Attorney, Agent, or Firm* — Thorpe, North & Western L.L.P.

(57) ABSTRACT

The present disclosure provides orthogonal non-Newtonian inkjet inks and related methods. In one example, an orthogonal non-Newtonian inkjet ink can comprise a low molecular weight organic gelator in an amount ranging from 0.1% to 10% by weight; a metal oxide in an amount ranging from 0.1% to 10% by weight; a first salt in an amount of 0.05% to 20% by weight; a second salt in an amount of 0.05% to 20% by weight; and an organic solvent. The metal oxide and the first salt form a first structured network and the low molecular weight organic gelator and the second salt form a second structured network.

15 Claims, 2 Drawing Sheets

(56) References Cited

U.S. PATENT DOCUMENTS

| | | | | |
|---|---|---|---|---|
| 8,741,044 | B1 * | 6/2014 | Chopra | C09D 11/34 106/31.29 |
| 2004/0065227 | A1 * | 4/2004 | Breton | C09D 11/34 106/31.29 |
| 2006/0159850 | A1 * | 7/2006 | Breton | C09D 11/101 106/31.13 |
| 2007/0211110 | A1 | 9/2007 | Iftime et al. | |
| 2008/0045618 | A1 | 2/2008 | Nagvekar | |
| 2012/0028002 | A1 | 2/2012 | Yokoi et al. | |
| 2013/0010040 | A1 | 1/2013 | Sekiguchi et al. | |
| 2013/0141505 | A1 | 6/2013 | Ikeda et al. | |

* cited by examiner

ORTHOGONAL NON-NEWTONIAN INKJET INKS

BACKGROUND

The use of ink-jet printing systems has grown dramatically in recent years. This growth may be attributed to substantial improvements in print resolution and overall print quality coupled. Today's ink-jet printers offer acceptable print quality for many commercial, business, and household applications at costs much lower than comparable products available just a few years ago. Notwithstanding their recent success, intensive research and development efforts continue toward improving ink-jet print quality, while further lowering cost to the consumer.

An ink-jet image is formed when a precise pattern of dots is ejected from a drop-generating device known as a "printhead" onto a printing medium. Inks normally used in ink-jet recording are commonly composed of water-soluble organic solvents (humectants, etc.), surfactants, and colorants in a predominantly aqueous fluid. When a recording is made on "plain paper," the deposited colorants retain some mobility, which can be manifest in poor bleed, edge acuity, feathering, and inferior optical density/chroma (due to penetration on the paper). These features adversely impact text and image quality. Other systems include using a coated paper or coating the paper immediately before printing with the inkjet ink. Such coatings generally contain various components such as fixers to reduce colorant mobility. However, such systems can be costly, can lower print quality, and can be limiting as the media is typically matched to the inks.

BRIEF DESCRIPTION OF THE DRAWINGS

Additional features and advantages of the disclosure will be apparent from the detailed description which follows, taken in conjunction with the accompanying drawings, which together illustrate, by way of example, features of the technology; and, wherein.

Figure 1:
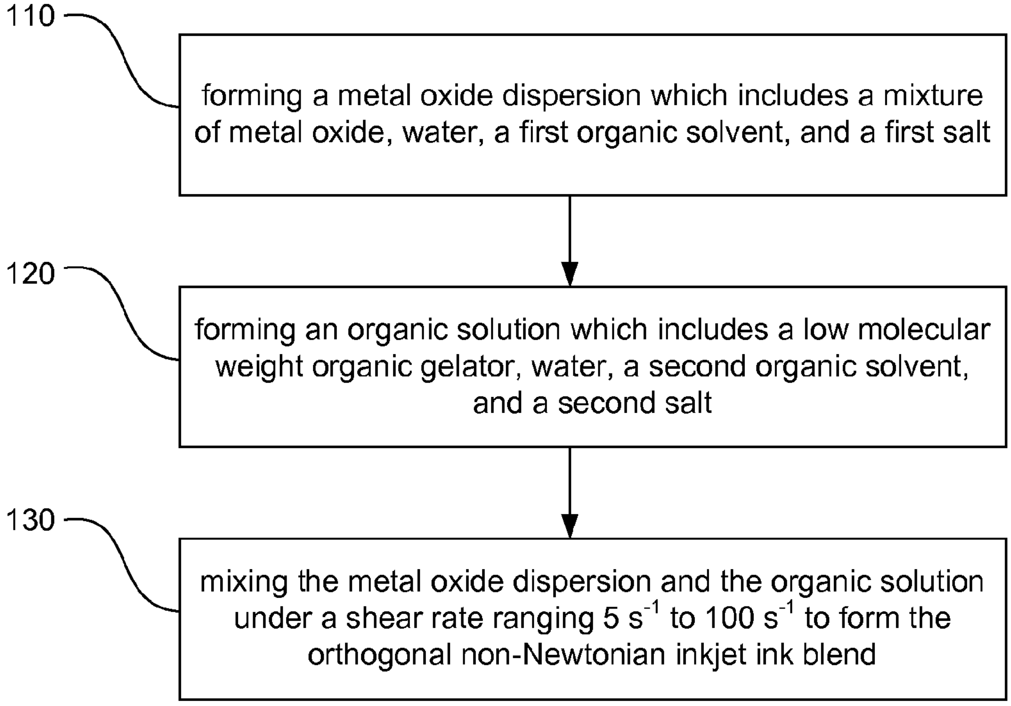
FIG. 1 is a flow chart of a method in accordance with an example of the present disclosure.

Reference will now be made to the exemplary embodiments illustrated, and specific language will be used herein to describe the same. It will nevertheless be understood that no limitation of the scope of the disclosure is thereby intended.

DETAILED DESCRIPTION

In accordance with the present disclosure, orthogonal blends of non-Newtonian inkjet inks can be prepared where the viscosity of the inks can be manipulated by physical forces allowing for printing of the inks via inkjet technologies while achieving increased viscosity after printing. Notably, the reformation of structured networks within the orthogonal blends after printing can allow for the present non-Newtonian inkjet inks to provide better optical density than achieved by traditional Newtonian inkjet inks.

More particularly, examples in accordance with the present disclosure are directed to orthogonal non-Newtonian inkjet inks that are useful in standard inkjet printing systems. The present orthogonal blends can be inkjet printed as the viscosity of the non-Newtonian inkjet inks can be lowered using thermal/mechanical control within a printing system, e.g., an inkjet printhead. Once exiting the printhead, the viscosity of the present orthogonal blends rapidly increases (e.g. within 30 seconds) via self-assembly of structured networks within the orthogonal blends. Generally, the structured networks can be assembled between a metal oxide and a first salt and between a low molecular weight organic gelator and a second salt, all of which are part of the orthogonal non-Newtonian inkjet inks of the present disclosure.

It is noted that when discussing the present compositions and methods, each of these discussions can be considered applicable to each of these embodiments, whether or not they are explicitly discussed in the context of that embodiment. Thus, for example, in discussing a low molecular weight organic gelator used in an orthogonal non-Newtonian inkjet ink, such a low molecular weight organic gelator can also be used in a method of manufacturing an orthogonal non-Newtonian inkjet ink and/or a method of printing an orthogonal non-Newtonian inkjet ink, and vice versa.

It is also noted that when referring to an "ink" or an "inkjet ink," this does not infer that a colorant necessarily be present. Inks, as defined herein, can be colorant free or can alternatively include colorant.

Generally, recording media and/or inkjet inks can have a variety of additives and coatings to provide acceptable quality when used in printing applications. However, utilizing the present non-Newtonian inkjet inks can eliminate often used print media layers, can eliminate costly additives, and/or can eliminate the amounts of materials often used in media sheets and/or inks.

With the above in mind, an orthogonal non-Newtonian inkjet ink or ink blend can comprise a low molecular weight organic gelator in an amount ranging from 0.1% to 10% by weight based on the total weight of the orthogonal non-Newtonian inkjet ink; a metal oxide in an amount ranging from 0.1% to 10% by weight based on the total weight of the orthogonal non-Newtonian inkjet ink; a first salt in an amount of 0.05% to 20% by weight based on the total weight of the orthogonal non-Newtonian inkjet ink; a second salt in an amount of 0.05% to 20% by weight based on the total weight of the orthogonal non-Newtonian inkjet ink; and an organic solvent. The salt(s) can be a single salt that is used for both networks to form, or alternatively, two (or more) distinct salts can be used to form the networks. The first salt may be used to form the metal oxide structured network, the second salt may be used to form the organic gelator structured network, or vice versa. Furthermore, once mixed, both salts may contribute to both network formations upon printing on a media substrate.

Generally, the metal oxide and the first salt form a first structured network and the low molecular weight organic gelator and the second salt form a second structured network, where the orthogonal non-Newtonian inkjet ink can have a dynamic viscosity ranging from 25 cps to 10,000 cps at a shear rate of 5 $s^{-1}$ and a dynamic viscosity ranging from 1 cps to 50 cps at a shear rate of 10,000 $s^{-1}$, measured at a temperature of 25° C. In another example, the orthogonal non-Newtonian ink can have a dynamic viscosity ranging from 25 cps to 10,000 cps at shear rate of 100 $s^{-1}$ at a temperature of 25° C. and a dynamic viscosity ranging from 1 cps to 50 cps at a shear rate of 10,000 $s^{-1}$ at a temperature of 25° C. The first dynamic viscosity is generally higher than the second dynamic viscosity. In one example, the viscosity can be higher than 10,000 cps, such as at least 20,000 cps, at least 100,000 cps, or even at least 500,000 cps. In another example, the orthogonal non-Newtonian inkjet ink can have a viscosity ranging from 25 cps to 10,000 cps at a temperature of 25° C. and a viscosity ranging from 1 cps to 50 cps at a temperature of 50° C. Notably, the combination of shearing and heating can alter, e.g. lower, the viscosity profiles of the present inks.

As used herein, "structured network" refers to the three dimensional structure formed by either a low molecular weight organic gelator or a metal oxide and a salt via electrostatic interactions and/or physical interactions in the non-Newtonian inkjet ink, wherein the three dimensional structure is dependent upon mechanical and/or thermal forces. Such mechanical and/or thermal forces, such as shear energy or heat energy, weaken the structured network such that the viscosity changes based on the amount of force applied, as discussed herein. In one example, the structured network can be free of polymers in that the three dimensional structure does not comprise polymers. However, such an example does not preclude polymers to be present within the non-Newtonian inkjet ink, or even trapped or contained within the structured network. For example, the present orthogonal non-Newtonian inkjet inks can further comprise a polymeric surfactant that does not self-assemble as part of the three dimensional structure, but can be present within such a structure. In one specific example, the structured network can be in the form of a gel.

Regarding the present description as it relates to "non-Newtonian," a non-Newtonian fluid is one in which viscosity changes with changes with an applied force, e.g. thermal or shear, resulting in a viscosity which may not be well-defined. As such, in one aspect, the present non-Newtonian fluids can be thinned by increasing the temperature of the fluids. In another aspect, the present non-Newtonian fluids can be thinned by shearing the fluids. Typically, in inkjet printing applications, ink is moved between a fluid container and the printhead of an inkjet device. In these applications, the present non-Newtonian inkjet inks can be heated at the fluid container, between the fluid container and the printhead, or in the printhead, thereby decreasing viscosity allowing for inkjet printing followed by rapid cooling and structured network reformation on a recording medium. Additionally, in another example, such inks can be sheared in the printhead thereby decreasing the viscosity allowing for inkjet printing followed by structured network reformation on the recording medium.

In an aspect of these orthogonal non-Newtonian inkjet inks that may not be intuitive to many observers, the colorants, e.g. dispersed pigments which may even be large and dense pigments, show little or no settling in the fluid container or printhead during the times when the ink is not moving through the system or when the ink is not heated. When little or no dynamic pressure is being applied to the ink to move it through the system or when no heat is being applied to the ink, the ink has a viscous consistency. However, when the normal amount of dynamic pressure (~at least 10,000 Pascals) is applied to the ink to move it through the inkjet system or when the ink is heated to 50° C., the ink viscosity changes to something more resembling a classical Newtonian inkjet ink, e.g. from 1 to 5 cps.

Thus, when such inks are ejected at a high frequency from the fluid container of an inkjet fluid dispensing device, the dynamic viscosities of the inks are at a low level that does not interfere with the ejection process of the inkjet system. Generally, during the time when the ink is not moving or being heated, settling is either completely prevented or slowed down by as much as several orders of magnitude.

Without intending to be bound by any particular theory, when low molecular weight organic gelators and metal oxides described herein are used, the resultant printed structures can form by pi-pi stacking of aromatic groups and hydrogen bonding. The dissolved salt cations and anions can shield the repulsive electrostatic charge between the charged low molecular weight organic gelator or metal oxide species and allow them to interact via the van der Waal forces. Such interactions can result in fiber formation and entangled fibers for low molecular gelators and can swell in the presence of water and/or solvent molecules. For metal oxides in the presence of salts, a similar process electrostatic charge shielding results in a three dimensional network. Furthermore, the salts can act to strengthen the fibers or structured network primarily on the recording media. Thus, some treated papers, e.g. ColorLok® papers, which include additional calcium ions, can interact with fibers that form from the low molecular weight organic gelator in particular. Upon heating, the fibers can separate forming discrete domains thereby minimizing interactions between fibers and thereby decreasing viscosity. After sufficient heating, the fibers can be reduced to monomer units of the low molecular weight organic gelators. In the "monomer" form, the viscosity can be expected to be quite low because the size of the structure is smaller.

Regarding the present orthogonal blends, the term "orthogonal" refers to the individual nature of structured networks of the blend in that each structured network is independently formed and controlled. As such, the present orthogonal blends can comprise the characteristics of each structured network formed by the organic gelator/salt and the metal oxide/salt, respectively. Such blending can provide unique inks having desirable properties based on each of the systems. For example, an orthogonal blend can have high color holdout provided by one of the structured networks and can have a high durability provided by the other structured network.

In one example, a first structured network can comprise a low molecular weight organic gelator. As used herein, "low molecular weight organic gelator" refers to an organic molecule or oligomer that is able to form a three dimensional structure with a salt in the presence of an organic solvent and/or water to form a structured network. As used herein "oligomer" refers to a compound comprised of no more than 10 monomer units. Regarding low molecular weight, in one example, the present low molecular weight organic gelators can have a weight average molecular weight of 50 to 10,000 Mw. For oligomers, the present molecular weights refer to weight average molecular weights. In one aspect, the molecular weight can be from 100 to 2,000 Mw.

The present low molecular weight organic gelators can include amino acids. Such amino acids can include peptides and cyclic peptides. In one example, the amino acids can include a protecting group, e.g., an amine protecting group. In one example, the amino acid can be an aliphatic amino acid such as glycine, alanine, valine, leucine, or isoleucine. In another example, the amino acid can be a hydroxyl or sulfur/selenium-containing amino acid such as serine, cysteine, selenocysteine, threonine, or methionine. In still another example, the amino acid can be a cyclic amino acid such as proline or a cyclic peptide. In yet another example, the amino acid can be an aromatic amino acid such as phenylalanine, tyrosine, or tryptophan. In still another example, the amino acid can be a basic amino acid such as histidine, lysine, or arginine. In still yet another example, the amino acid can be an acidic amino acid or amide-containing amino acid such as aspartate, glutamate, asparagine, or glutamine. Such amino acids can be individually functionalized with the presently disclosed protecting groups or can be combined into peptides, including cyclic peptides, with such functionalization. Regarding the amine protecting groups, in one example, the amine protecting group can be a fluorenyl methoxy carbonyl group. In another example, the amine protecting group can be an aromatic protecting group. Other derivatives can include naphthalene or naphthyl based peptides. In one specific example, the low molecular weight organic gelator can be N-(9-fluorenylmethoxycarbonyl)-L-phenylalanine. In another example, the low molecular weight organic gelator can be a dipeptide of N-(9-fluorenylmethoxycarbonyl)-L-phenylalanine. Other examples include naphthalene derivatives of N-(9-fluorenylmethoxycarbonyl)-L-phenylalanine. Fluorenylmethoxycarbonyl peptide derivative materials can be obtained from BaChem Chemicals Co.

As discussed herein, the low molecular weight organic gelator can generally be present in the non-Newtonian inkjet ink in an amount ranging from 0.1% to 10% by weight based on the total weight of the non-Newtonian inkjet ink. In one example, the low molecular weight organic gelator can be present in an amount of 1% to 5% by weight, and in one aspect, 0.5% to 2% by weight; based on the total weight of the non-Newtonian inkjet ink.

In another example, the second structured network can comprise a metal oxide. As used herein, "metal oxide" refers to a molecule comprising at least one metal or semi-metal (e.g., Si) atom and at least one oxygen atom which in a particulate form is able to form a three dimensional structure in the presence of salt dissolved in an organic solvent and/or water, thereby forming a structured network. As used herein "semi-metal" includes boron, silicon, germanium, arsenic, antimony, and tellurium, for example. In one example, the metal oxide can include with limitation aluminum oxide, silicon dioxide, zinc oxide, iron oxide, titanium dioxide, indium oxide, zirconium oxide, or mixtures thereof. As discussed herein, the metal oxide (again which is defined to include both metal and semi-metal oxides) can generally be present in the non-Newtonian inkjet ink in an amount ranging from 0.1% to 10% by weight based on the total weight of the non-Newtonian inkjet ink. In one example, the metal oxide can be present in an amount at from 1% to 5% by weight, and in one aspect, at from 0.5% to 2% by weight, based on the total weight of the non-Newtonian inkjet ink. Additionally, the particle size of the metal oxide can be varied depending on the desired properties of the non-Newtonian inkjet ink. For example, the bigger the particle size, the less viscous the non-Newtonian inkjet ink tends to be. In one example, the particle size can be from 5 nm to 50 nm. In another aspect, the particle size can be from 10 nm to 25 nm.

Metal oxide particles, e.g. $Fe_3O_4$, can be dispersed with dispersants. Examples of suitable dispersants include, but are not limited to, water-soluble anionic species of low and high molecular weight such as phosphates and polyphosphates, phosphonates and polyphosphonates, phosphinates and polyphosphinates, carboxylates (such as citric acid or oleic acid), polycarboxylates (such as acrylates and methacrylates). Other examples include hydrolysable alkoxysilanes with alkoxy group attached to water-soluble (hydrophilic) moieties such as water-soluble polyether oligomer chains, phosphate group or carboxylic group. In some examples, the dispersant used to disperse metal oxide particles can be a polyether alkoxysilane or polyether phosphate dispersant.

Examples of polyether alkoxysilane dispersants used to dispersed metal oxide particles can be represented by the following general Formula (I):

(I)

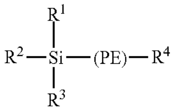

wherein:

a) $R^1$, $R^2$ and $R^3$ are hydroxy groups, or hydrolyzable linear or branched alkoxy groups. For hydrolyzable alkoxy groups, such groups can have 1 to 3 carbon atoms; in one aspect, such groups can be —$OCH_3$ and —$OCH_2CH_3$. In some examples, $R^1$, $R^2$ and $R^3$ are linear alkoxy groups having from 1 to 5 carbon atoms. In some other examples, $R^1$, $R^2$ and $R^3$ groups are —$OCH_3$ or —$OC_2H_5$.

b) PE is a polyether oligomer chain segment of the structural formula $[(CH2)_n—CH(R)—O]_m$, attached to Si through Si—C bond, wherein n is an integer ranging from 0 to 3, wherein m is an integer superior or equal to 2 and wherein R is H or a chain alkyl group. R can also be a chain alkyl group having 1 to 3 carbon atoms, such as $CH_3$ or $C_2H_5$. In some examples, m is an integer ranging from 3 to 30 and, in some other examples, m is an integer ranging from 5 to 15. The polyether chain segment (PE) may include repeating units of polyethylene glycol (PEG) chain segment (—$CH_2CH_2$—O—), or polypropylene glycol (PPG) chain segment (—$CH_2$—$CH(CH_3)$—O—), or a mixture of both types. In some examples, the polyether chain segment (PE) contains PEG units (—$CH_2CH_2$—O—); and c) $R^4$ is hydrogen, or a linear or a branched alkyl group. In some examples, $R^4$ is an alkyl group having from 1 to 5 carbon atoms.

Other examples of dispersants used to disperse metal oxide particles can include polyether alkoxysilane dispersants having the following general Formula (II):

(II)

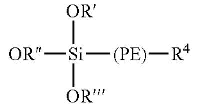

f wherein R', R" and R'" are linear or branched alkyl groups. In some examples, R', R" and R'" are linear alkyl groups having from 1 to 3 carbon atoms in chain length. In some examples, R', R" and R'"—$CH_3$ or —$C_2H_5$. $R^4$ and PE are as described above for Formula (I); i.e. PE is a polyether oligomer chain segment of the structural formula: $[(CH_2)_n—CH—R—O]_m$, wherein n is an integer ranging from 0 to 3, wherein m is an integer superior or equal to 2 and wherein R is H or a chain alkyl group; and $R^4$ is hydrogen, or a linear or a branched alkyl group. In some examples, $R^4$ is $CH_3$ or $C_2H_5$.

In some examples, the metal oxide particles present in the ink composition are dispersed with polyether alkoxysilanes. Examples of suitable polyether alkoxysilanes include $(CH_3O)_3Si—(CH_2CH_2O)_n$, H; $(CH_3CH_2O)_3Si—(CH_2CH_2O)_n$, H; $(CH_3O)_3Si—(CH_2CH_2O)_n$, $CH_3$; $(CH_3CH_2O)_3Si—(CH_2CH_2O)_n$, $CH_3$; $(CH_3O)_3Si—(CH_2CH_2O)_n$, $CH_2CH_3$; $(CH_3CH_2O)_3Si—(CH_2CH_2O)_n$, $CH_2CH_3$; $(CH_3O)_3Si—(CH_2CH(CH_3)O)_n$, H; $(CH_3CH_2O)_3Si—(CH_2CH(CH_3)\ 0)_n$, H; $(CH_3O)_3Si—(CH_2CH(CH_3)O)_n$, $CH_3$; $(CH_3CH_2O)_3Si—(CH_2CH(CH_3)$ O)$_{n'}$, $CH_3$; wherein n' is an integer equal to 2 or greater. In some examples, n' is an integer ranging from 2 to 30 and, in some other examples, n' is an integer ranging from 5 to 15.

Commercial examples of the polyether alkoxysilane dispersants include, but are not limited to, Silquest®A-1230 manufactured by Momentive Performance Materials and Dynasylan® 4144 manufactured by Evonik/Degussa.

The amount of dispersant used in the metal oxide dispersion may vary from about 1% by weight to about 300% by weight of the metal oxide particles content. In some examples, the dispersant content range is between about 2 to about 150% by weight of the metal oxide particles content. In some other examples, the dispersant content range is between about 5 to about 100% by weight of the metal oxide particles content. The dispersion of metal oxide particles can be prepared via milling or dispersing metal oxide powder in water in the presence of suitable dispersants.

The metal oxide dispersion may be prepared by milling commercially available inorganic oxide pigment having large particle size (in the micron range) in the presence of the dispersants described above until the desired particle size is achieved. The starting dispersion to be milled can be an aqueous dispersion with solid content up to 40% by weight of the metal oxide pigment. The milling equipment that can be used is a bead mill, which is a wet grinding machine capable of using very fine beads having diameters of less than 1.0 mm (and, generally, less than 0.3 mm) as the grinding medium, for example, Ultra-Apex Bead Mills from Kotobuki Industries Co. Ltd. The milling duration, rotor speed, and/or temperature may be adjusted to achieve the dispersion particle size desired.

Generally, the structured networks comprise a salt, and typically a dissolved salt. In one example, the salts used with each type of structured network, e.g., metal oxide and low molecular weight organic gelator, can be distinct, e.g., an inorganic and organic salt, two different salts of the same type, etc. However, in one example, the salt can be the same for both structured network, provided the salt is present and available for both networks to form. As such, each structured network can include any type of salt as discussed herein.

Generally, the ink and resultant structured network comprises a salt. In one example, the salt can be an organic salt (e.g. tetraethyl ammonium, tetramethyl ammonium, acetate salts, etc.). In another aspect, the salt can include salts of carboxylic acids (e.g. sodium or potassium 2-pyrrolidinone-5-carboxylic acid), sodium or potassium acetate, salts of citric acid or any organic acid including aromatic salts, and mixtures thereof. In another example, the salt can be an inorganic salt (e.g., sodium nitrate). In one aspect, the salt can be a monovalent salt. Such monovalent salts can include sodium, lithium, potassium cations and nitrate, chloride, acetate anions, and mixtures thereof. In another aspect, the salt can be multivalent, e.g. divalent, and can include calcium nitrate, magnesium nitrate, and mixtures thereof.

As discussed herein, the salt can generally be present in the non-Newtonian inkjet ink in an amount ranging from 0.1% to 40% by weight based on the total weight of the non-Newtonian inkjet ink. In one example, the salt can be present in an amount of 1% to 20% by weight, and in some aspects, 0.5% to 4%, 0.5% to 3%, or 1% to 2%, by weight; based on the total weight of the non-Newtonian inkjet ink. If multiple salts are used, e.g., one for each structured network, then each salt might be present from 0.05% to 20% by weight, from 0.5% to 10% by weight, from 0.25% to 2% by weight, from 0.25% to 1.5%, from 0.5% to 1% by weight, etc.

The inclusion of a salt, particularly a dissolved salt in one or both of gelator inks (prior to or after admixing the two gelator inks together) can contribute to the structure of the ink. In the case of metal oxide gelators, a salt can act to shield the electrostatic repulsion between particles and permit the van der Waals interactions to increase, thereby forming a stronger attractive potential and resulting in a structured network by providing elastic content to a predominantly fluidic system. As mentioned, these structured systems show non-Newtonian flow behavior, thus providing useful characteristics for implementation in an ink-jet ink because their ability to shear or thermal thin for jetting. Once jetted, this feature allows the jetted drops to become more elastic-, mass-, or gel-like when they strike the media surface. These characteristics can also provide improved media attributes such as colorant holdout on the surface.

Regarding the inks of the present disclosure (with or without colorant), the role of salt can impact both the jettability and/or the response after jetting. When comparing two gelator inkjet ink (with or without salt, but otherwise identical), the ink with salt will typically have a lower viscosity over a range of shear rates. In one example, the salt can be added such that its presence in this system is just enough to make an appreciable difference in the printing characteristics of the ink, but not so much that the ink becomes too low in viscosity. This salt concentration can be determined by routine experimentation after considering the present disclosure. For example, the salted gelator ink can be designed so that the ink can refill quickly and produce a higher quality print. Higher quality printing can be determined in one aspect by improved optical density (when a colorant is present in the ink). Typically, inks with salt can have higher optical densities, while retaining good jettability properties and other properties, such as ink structure, rheological behavior, shear thinning, and jetting of ink drops. Furthermore, salt can also contribute to the gelator inks of the present disclosure having decreased restructuring time after shear or thermal thinning for printing. Higher pre-shear rates can often result in a likewise faster response in the presence of salt. In these instances, a fast restructuring of the ink can mean more solid-like behavior on the media surface in less time with less fluid penetration, and thus better colorant holdout and greater ink efficiency.

The properties of the non-Newtonian inkjet ink, e.g., viscosity, optical density, ink efficiency, etc., can be affected by a number of variables including the type of metal oxide, the type of salt, the type of solvents, the amounts of these components, pH, ionic strength, etc. Regarding viscosity, as discussed herein, the viscosity for non-Newtonian fluids are not discrete but change based on the physical energy applied to the fluid. As used herein, "viscosity" refers to dynamic viscosity unless otherwise stated. For the present inks, the viscosity can generally be measured at two states: proximate in time to an at rest state; i.e., with a minimum shear applied to the ink (shear rate as low as 5 $s^{-1}$), and proximate in time to a processing state; i.e., with a significant shear applied to the ink (shear rate of 10,000 $s^{-1}$). In one example, the present orthogonal ink blends can have a dynamic viscosity ranging from 100 cps to 10,000 cps at rest and a dynamic viscosity ranging from 1 cps to 25 cps at a processing state. In one example, the dynamic viscosity can be 100 cps to 1,000 cps at a rest state and can be 1 cps to 15 cps at a processing state.

Additionally, the gelators, metal oxides, and the salts can be present in the ink blend (orthogonal ink) at a ratio that allows for formation of the multiple structured networks. In one example, the metal oxide and the first salt can be present at a metal oxide to first salt ratio ranging from 0.5:1 to 5:1 by weight. In one aspect, the ratio can be from 2:1 to 3:1. In another example, the low molecular weight organic gelator and the second salt can be present at a low molecular weight organic gelator to second salt ratio ranging from 1:1 to 1:5 by weight. In one aspect, the ratio can be from 0.5:1 to 2:1. If a single salt is used, then the ratio of metal oxide to gelator to salt can be adjusted accordingly so that at least some of the salt is used to form the two respective structured networks.

Generally, the present structured network is formed in an organic solvent. As used herein, "organic solvent" refers to any organic solvent or mixture thereof. As such, the term organic solvent includes systems of solvents. The present organic solvents are in addition to any water present in the non-Newtonian inkjet ink. Typical organic solvents that can be used include methanol, ethanol, propanol, iso-propanol, a glycol ether having at least about four carbon atoms, C4-8 alcohols, 1-methoxy-2-propanol, 2-methoxy ethanol, 2-ethoxy ethanol, 1-methoxy-2-acetoxy propane, ethyl lactate, a glycol ether (optionally having at least about 10 carbon atoms), a dihydric alcohol (optionally having at least about 2 carbon atoms), tripropylene glycol monomethyl ether, tripropylene glycol-n-butyl ether, propylene glycol phenyl ether, 2-pyrrolidinone (2P), 1-(2-hydroxyethyl)-2-pyrrolidinone (2HE2P), glycerol polyoxyethyl ether (LEG-1), 1,3-Bis(2-Hydroxyethyl)-5,5-Dimethylhydantoin (Dantocol® DHE), 2-methyl-1,3-propanediol (MPdiol), ethylhydroxy-propanediol (EHPD), glycerol, 1,5-pentanediol, 1,2-pentanediol, thiodiglycol, sulfolane, 1,3-dimethyl-2-imidazolidinone, caprolactam, ethylene glycol, diethylene glycol, triethylene glycol, tetraethylene glycol, propylene glycol, dipropylene glycol, tripropylene glycol, trimethylene glycol, butylene glycol, hexylene glycol, polyethylene glycol, polypropylene glycol, glycerol, 1,2,6-hexanetriol, ethylene glycol monomethyl ether, ethylene glycol monoethyl ether, diethylene glycol monomethyl ether, diethylene glycol monoethyl ether, diethylene glycol dimethyl ether, and mixtures thereof.

Additionally, organic solvents can be classified as network participating solvents and network non-participating solvents. As used herein, "network participating solvent" refers to organic solvents that increase viscosity of the non-Newtonian inkjet ink, typically measured at any temperature functional. As used herein, "network non-participating solvent" refers to organic solvents that decrease the viscosity of the non-Newtonian inkjet ink, measured at any functional temperature. As such, the present non-Newtonian inkjet inks can be altered based on the types of organic solvents used. For example, when the non-Newtonian inkjet ink comprises a network participating solvent, the structured network can be strengthened, e.g., the viscosity of the non-Newtonian inkjet ink can be increased. However, when a network non-participating solvent is used, the structured network can be weakened, e.g., the viscosity of the non-Newtonian inkjet ink can be decreased. In one example, network participating solvents can include ethylhydroxypropanediol (EHPD), glycerol, 1,5 pentanediol, ethylene glycol, triethylene glycol, and mixtures thereof. In another example, network non-participating solvents can include 2-pyrrolidinone, 1,2 pentanediol, MPDIOL, 1,2 hexanediol, and mixtures thereof. As such, the structured network properties, and resultant non-Newtonian inkjet ink properties, can be modified by mixing and matching particular organic solvents. In one example, the organic solvent comprises a mixture of a network participating solvent and a network non-participating solvent. Additionally, the present inks can contain a significant amount of organic solvent, including network participating solvents and/or network non-participating solvents. In one example, the organic solvent can be present in an amount ranging from 5% to 50% by weight based on the total weight of the non-Newtonian inkjet ink. In one aspect, the organic solvent can be present in an amount ranging from 10% to 40%, or even, 15% to 30% by weight.

In accordance with this, in one example, the optical density of the orthogonal non-Newtonian inkjet ink can be increased by at least 5% over a comparative inkjet ink printed from the same inkjet printer on the same recording media with the same print coverage. In other aspects, the optical density can be increased by 10%, 15%, 20%, or 30%. Such recording media can include both coated and uncoated recording media. As used herein, "comparative inkjet ink" refers to an aqueous Newtonian inkjet ink such as HP®970 Black ink cartridge.

As discussed herein, the present inks can include a colorant. Such colorants can include pigments and/or dyes. In one example, the colorant is a pigment, and in one aspect, a dispersed pigment. In another example, the colorant can be a dye. In yet another example, the colorant can be a mixture of a pigment and a dye.

The present inks can be used in conjunction with multiple imaging systems, non-limiting examples of which include thermal or piezo inkjet, dye-sub, thermal transfer, electrostatic, liquid electrophotographic printing (LEP), etc. Additionally, the present inks can include water, and can further include non-ionic, cationic, and/or anionic surfactants, ranging from 0.001% to 10% by weight. The present formulations can include other components, such as biocides, viscosity modifiers, materials for pH adjustment, sequestering agents, preservatives, and the like.

In addition to the orthogonal non-Newtonian inkjet inks described herein, the present disclosure provides for methods relating thereto. Turning now to FIG. 1, a method of manufacturing an orthogonal non-Newtonian inkjet ink, can comprise forming 110 a metal oxide dispersion which includes a mixture of metal oxide, water, a first organic solvent, and a first salt; forming 120 an organic solution which includes a low molecular weight organic gelator, water, a second organic solvent, and a second salt; and mixing 130 the metal oxide dispersion and the organic solution under a shear rate ranging 5 $s^{-1}$ to 100 $s^{-1}$ to form the orthogonal non-Newtonian inkjet ink. To provide a more specific example, the step of forming the metal oxide dispersion can include dispersing the metal oxide in an aqueous solution with an organic solvent to form a metal oxide dispersion, and mixing the first salt in the metal oxide dispersion. The step of forming the organic solution can include combining a low molecular weight organic gelator with an organic solvent with a salt solution. Once the two formulations are formed, in one example, the metal oxide dispersion and the organic solution can be admixed to form the orthogonal non-Newtonian inkjet ink.

Thus, in accordance with this, a mixed system of the two different types of gelators (e.g., metal oxide and low molecular weight gelator) can be used to generate a composition having a heterogenous, semi-liquid state. When one of the gelators is sensitive to thermal energy, heat can be used to homogenize the composition. Heating can be carried out prior to loading the inkjet reservoir. The homogenized ink mass can also be heated in the reservoir in preparation for printing. The heating temperature of the blended system is dependent on the melting point of the low molecular weight gelator, but is typically in the range of about 25° C. to about 150° C. After heating, a homogenous solution is produced which is then allowed to cool to room temperature. A gel or homogenous gel mass is formed, and in many examples, no phase separation is observed. Another technique to create the orthogonal blended system is to heat both metal oxide and low molecular weight gelator solutions separately and then mix them together while warm. After cooling, the system will again gel or form a homogenous mass.

It is noted that though the first salt and the second salt can be different, they can also be the same in some examples. Generally, the metal oxide, the first salt and the second organic solvent are present in amounts sufficient to form a first structured network and provide a dynamic viscosity ranging from 25 cps to 10,000 cps at a shear rate of 5 $s^{-1}$and a dynamic viscosity ranging from 1 cps to 50 cps at a shear rate of 10,000 $s^{-1}$. Generally, the low molecular weight organic gelator, the second salt, and the second organic solvent are present in amounts sufficient to form a second structured network and provide a dynamic viscosity ranging from 25 cps to 10,000 cps at a temperature of 25° C. and a dynamic viscosity ranging from 1 cps to 50 cps at a temperature of 25° C.

The present method can further comprise mixing a colorant into the non-Newtonian inkjet inks. In one example, the colorant can be a pigment. As discussed herein, such pigments can be self-dispersed or can further include dispersants, e.g., a polymer dispersant. In one example, commercially available colloidal metal oxide dispersions of particle sizes from 10 to 50 nm, such as silica and alumina, can be received from companies such as Nissan Chemical American Corporation and US Research Nanomaterials, Inc, among others.

Figure 2:
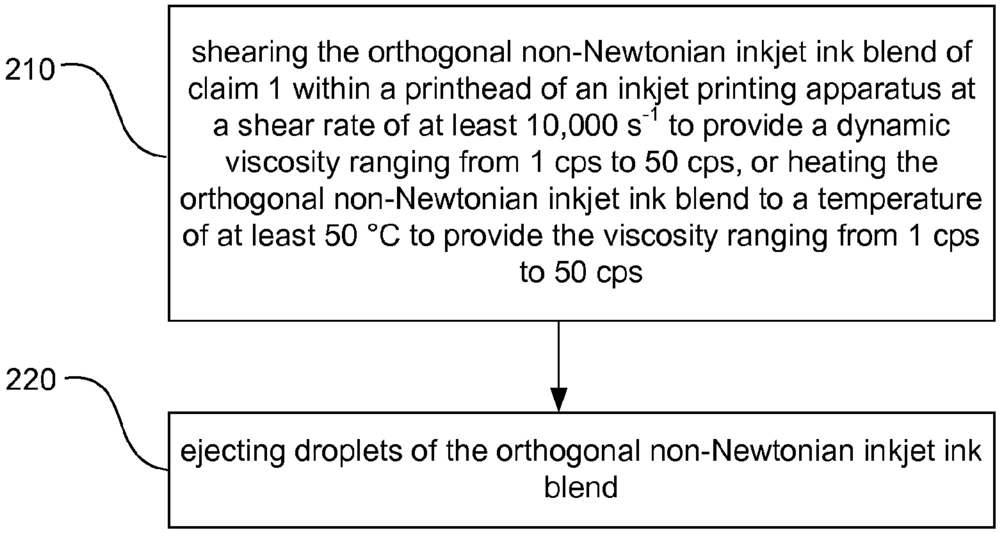
FIG. 2 is a flow chart of a method in accordance with an example of the present disclosure.

Turning now to FIG. 2, a method of printing an orthogonal non-Newtonian inkjet ink can comprise shearing 210 the orthogonal non-Newtonian inkjet ink within a printhead of an inkjet printing apparatus at a shear rate of at least 10,000 $s^{-1}$ to provide a dynamic viscosity ranging from 1 cps to 50 cps or heating the orthogonal non-Newtonian inkjet ink to a temperature of at least 50° C. to provide the viscosity ranging from 1 cps to 50 cps, and ejecting 220 droplets of the orthogonal non-Newtonian inkjet ink. Generally, as discussed herein, the orthogonal non-Newtonian inkjet ink can comprise a metal oxide, a low molecular weight organic gelator, a first salt, a second salt, and an organic solvent, wherein the metal oxide and the first salt form a first structured network and the low molecular weight organic gelator and the second salt form a second structured network.

Regarding the present method steps, such steps can be performed in a number of sequences and are not intended to be limited to the order written. For example, the adding of the low molecular weight organic gelator can be before dispersing the metal oxide, and vice versa. Additionally, it is noted that any and all combinations of such steps or individual step may be performed sequentially or simultaneously. For example, adding the low molecular weight organic gelator and dispersing the metal oxide may be performed sequentially or may be performed simultaneously.

Additionally, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

EXAMPLES

The following examples illustrate some embodiments of the present inks and methods that are presently known. However, it is to be understood that the following are only exemplary or illustrative of the application of the principles of the present inks and methods. Numerous modifications and alternative examples may be devised by those skilled in the art without departing from the spirit and scope of the present compositions and methods. The appended claims are intended to cover such modifications and arrangements. Thus, while the present inks and methods have been described above with particularity, the following examples provide further detail in connection with what are presently deemed to be the acceptable embodiments.

Example 1

Non-Newtonian Inkjet Inks

Two non-Newtonian inkjet inks were prepared with the components and the amounts listed in Table 1.

TABLE 1

| Components | Non-Newtonian Low Molecular Weight Organic Gelator Solution Ink (Ink 1) | Non-Newtonian Metal Oxide Gelator Dispersion Ink (Ink 2) |
|---|---|---|
| FMOC-PHE* | 3 wt % | — |
| Alumina dispersion (20 nm**) | — | 10 wt % |
| Sodium nitrate | 5 wt % | — |
| EHPD | 10 wt % | 10 wt % |
| Water | Balance | Balance |
| pH | 10 | 9 |

*FMOC-PHE is N-(9-fluorenylmethoxycarbonyl)-L-phenylalanine

**Dispersed aluminum oxide pH 4.5 (wt % by solids content in Ink)

Example 2

Blending of Non-Newtonian Inkjet Inks to form Orthogonal Ink

The two non-Newtonian inks of Example 1 were blended (about 1:1 weight ratio) at a shear rate of 5 to 100 $s^{-1}$ for a period of 2 minutes to form an orthogonal blend. The sample was then heated to 60° C. and allowed to cool to room temperature. A homogenous gel formed on cooling without phase separation. In this state, the inkjet ink is suitable for reheating and jetting from inkjet architecture. Cooling and reheating can be carried out repeatedly or as desired for the particular inkjet architecture.

Example 3

Viscosity vs. Shear Rate of Non-blended Inks vs. Orthogonally Blended Inks

The Low Molecular Weight Organic Gelator Ink (Ink 1) and the Metal Oxide Gelator Ink (Ink 2) of Example 1 were blended together to form an Orthogonal Blend (Orthogonal Ink) as described in Example 2 (heated to 60° C. and cooled to room temperature). Viscosity of each ink was measured using a CAP2000 rheometer from Brookfield Instruments at 25° C. and 50° C. at specific shear rates, as set forth in FIG. 3 and Table 2.

TABLE 2

| | Ink 1 (cps) | Ink 2 (cps) | Orthogonal Ink (cps) |
|---|---|---|---|
| Shear 1/s at 25° C. | | | |
| 133 | 33 | 188.9 | 219 |
| 633 | 8.7 | 59.2 | 64.2 |
| 1,333 | 5.1 | 34.8 | 33 |
| 5,333 | 2.4 | 14.9 | 12.2 |
| 10,667 | 2 | 10.2 | 9.8 |
| Shear 1/s at 50° C. | | | |
| 133 | — | 287 | 175 |
| 633 | — | 71.9 | 31.8 |
| 1333 | — | 45.8 | 14.8 |
| 5333 | — | 15.5 | 5.6 |
| 10,667 | — | 8.7 | 4.1 |

Note that no values are given for Ink 1 at 50° C. because with this specific ink, the system as a whole becomes too thinned for accurate measurement across the shear rates using the above-identified equipment.

As can be seen in Table 2 and FIG. 2, the viscosities vs. shear rates as measured from a high to low shear rate for Ink1, Ink 2, and the orthogonal blend are provided at two different temperatures. At 25° C., the viscosity of the blended system was dominated by the metal oxide based Ink 2. In fact, as noted in FIG. 2, there is little change in viscosity vs. shear rate for Ink 2 as compared to the blended system. Ink 1 has a lower viscosity versus decreasing shear rate and can be attributed to the mechanical shearing of the temperature sensitive network, and creation of a heterogeneous mixture of semi-fluid nature. Incidently, Ink 1, when measured first at the lowest shear rate value of 133 1/s, had a viscosity on the order of 700 cps. It is quickly shear thinned as the shear rate is increased.

Figure 3:
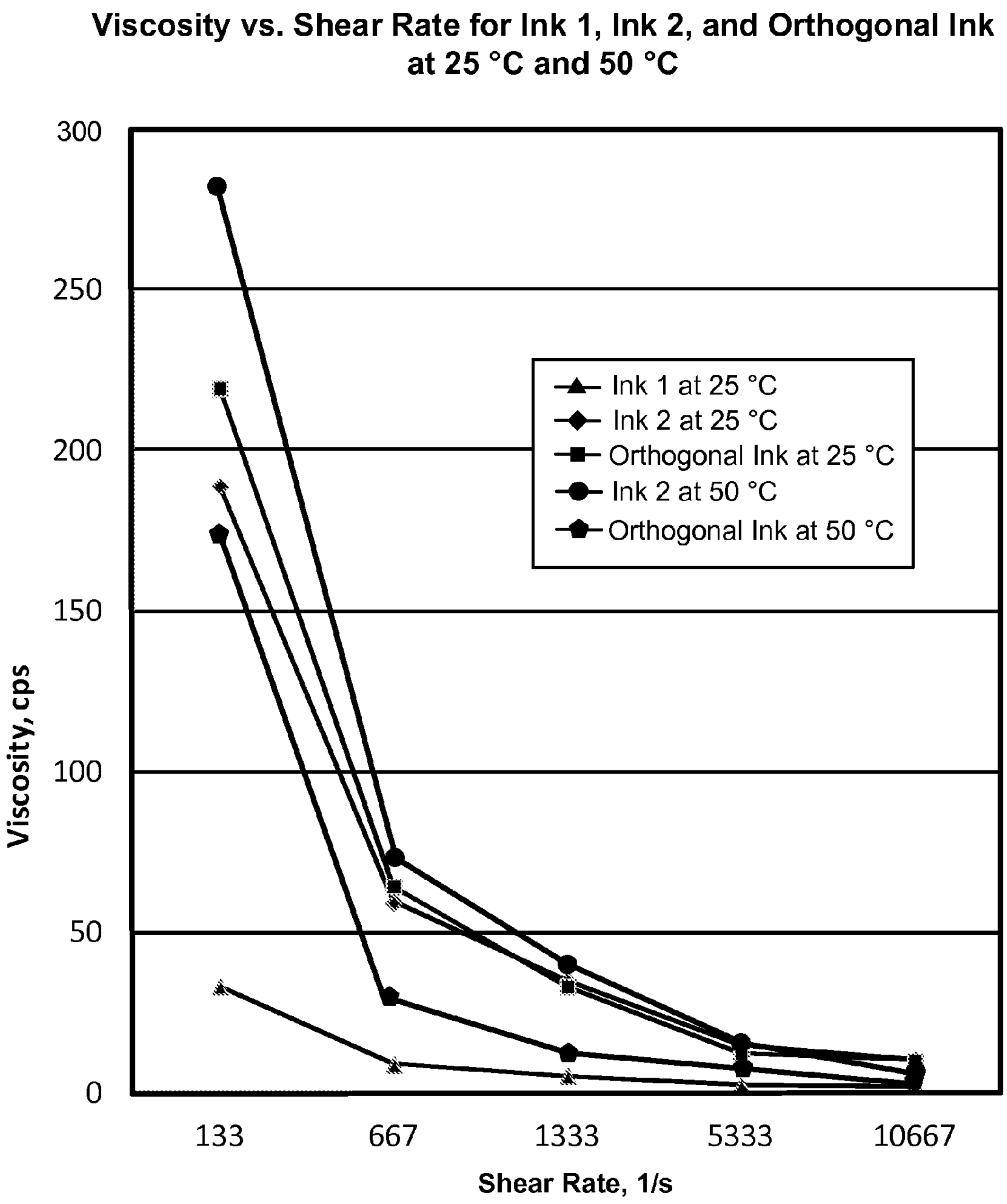
FIG. 3 is a graph depicting viscosity vs. shear rate for various inks at various temperatures.

It is notable that the comparison between the individual inks as compared to the orthogonal ink blend with respect to viscosity will be impacted by a dilution factor. The blend is an equal weight mixture of the two inks on a component by component basis will be decreased by 2 times in this case. This effect on viscosity should be reflected by a decrease in the viscosities measured. At 25° C., the blended viscosities were similar to Ink 2 and evidently not necessarily impacted by a dilution factor. This suggests that at 25° C., the mechanical shearing of Ink 1 may impact the blended system viscosity via a separate mechanism. At 50° C., the same measurements are repeated on a new sample of material. In this case, Ink 1 is in a semi-liquid or heterogenous state. Ink 2 shows similar behavior as at 25° C. but with some increased thinning occurring at the highest shear rate as expected with higher temperature. In this case, the blend at 50° C. is lower in viscosity compared to Ink 2 due to dilution factor and thermally thinning effects. Furthermore, the blend at 50° C. is lower than what we observed at 25° C., as seen in FIG. 3. This suggests that at 50° C., the thermal thinning of Ink 1 has larger impact on the blended system compared to that at 25° C., as might be expected with a thermally sensitive network. The effect is about 2× lower in viscosities as higher shear rates are approached.

Furthermore, if the blend is heated to high enough temperature, e.g., about 60° C., until a homogeneous solution is obtained and then allowed to cool, it will revert back to a homogeneous gel state. Thus, with thermal shear, the system can be repeatedly thinned and returned to a homogeneous gel state at 25° C. At 50° C. and higher, the two inks may interact and impact the behavior of one another, but revert to their original state at 25° C. Thus, one can adjust the properties of each ink system to be triggered and differentiated by the independent composition of each. Furthermore one can control the degree of interaction via the mechanical and thermal properties of each ink system which in turn can be used to adjust the attributes of the ink independently. The temperatures of this example are for this specific system. Other inks could be designed to work at other temperature parameters, as would be appreciated by one skilled in the art after considering the present disclosure.

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. An orthogonal non-Newtonian inkjet ink, comprising:

a metal oxide in an amount ranging from 0.1% to 10% by weight based on the total weight of the orthogonal non-Newtonian inkjet ink;

a low molecular weight organic gelator in an amount ranging from 0.1% to 10% by weight based on the total weight of the orthogonal non-Newtonian inkjet ink;

a first salt in an amount of 0.05% to 20% by weight based on the total weight of the orthogonal non-Newtonian inkjet ink;

a second salt in an amount of 0.05% to 20% by weight based on the total weight of the orthogonal non-Newtonian inkjet ink; and an organic solvent, wherein the metal oxide and the first salt form a first structured network and the low molecular weight organic gelator and the second salt form a second structured network.

2. The orthogonal non-Newtonian inkjet ink of claim 1, wherein the orthogonal non-Newtonian inkjet ink has a dynamic viscosity ranging from 25 cps to 10,000 cps at a shear rate of 5 $s^{-1}$ and a dynamic viscosity ranging from 1 cps to 50 cps at a shear rate of 10,000 $s^{-1}$, measured at a temperature of 25° C.; or the orthogonal non-Newtonian inkjet ink has a viscosity ranging from 25 cps to 10,000 cps at a temperature of 25° C. and a viscosity ranging from 1 cps to 50 cps at a temperature of 50° C.

3. The orthogonal non-Newtonian inkjet ink of claim 1, wherein the metal oxide is selected from the group consisting of aluminum oxide, silicon dioxide, zinc oxide, iron oxide, titanium dioxide, indium oxide, zirconium oxide, and mixtures thereof;

the low molecular weight organic gelator is selected from the group consisting of amino acids, peptides, cyclic peptides, amino acids having a protecting group, peptides having a protecting group, cyclic peptides having a protecting group, and mixtures thereof; and the first salt and the second salt is independently includes i) a carboxylic acid or a cation selected from the group consisting of sodium, lithium, potassium, magnesium, and calcium; and ii) an anion selected from the group consisting of nitrate, chloride, sulfate, and acetate.

4. The orthogonal non-Newtonian inkjet ink of claim 1, wherein the first and second structured networks are free of polymer.

5. The orthogonal non-Newtonian inkjet ink of claim 1, wherein the organic solvent is network participating solvent selected from the group consisting of ethylhydroxypropanediol (EHPD), glycerol, 1,5 pentanediol, ethylene glycol, triethylene glycol, and mixtures thereof; or the organic solvent is a network non-participating solvent selected from the group consisting of 2-pyrrolidinone, 1,2 pentanediol, 2-methyl-1,3-propanediol (MPDIOL), 1,2 hexanediol, and mixtures thereof.

6. The orthogonal non-Newtonian inkjet ink of claim 1, wherein the organic solvent comprises only network participating solvent, or comprises a mixture of network participating solvent and network non-participating solvent.

7. The orthogonal non-Newtonian inkjet ink of claim 1, wherein the first salt and the second salt are the same.

8. The orthogonal non-Newtonian inkjet ink of claim 1, wherein the metal oxide is present in an amount ranging from 1% to 5% by weight based on the total weight of the orthogonal non-Newtonian inkjet ink, the low molecular weight organic gelator is present in an amount ranging from 1% to 5% by weight based on the total weight of the orthogonal non-Newtonian inkjet ink, the first salt is present in an amount ranging from 0.05% to 4% by weight based on the total weight of the orthogonal non-Newtonian inkjet ink, and the second salt is present in an amount ranging from 0.5% to 10% by weight based on the total weight of the orthogonal non-Newtonian inkjet ink.

9. The orthogonal non-Newtonian inkjet ink of claim 1, wherein the metal oxide and the first salt are present at a metal oxide to salt ratio ranging from 0.5:1 to 5:1 by weight, the metal oxide having an average particle size ranging from 5 to 50 nm, and the low molecular weight organic gelator and the second salt are present at an organic gelator to salt ratio ranging from 1:1 to 1:5 by weight.

10. The orthogonal non-Newtonian inkjet ink of claim 1, further comprising a colorant, wherein the optical density of the non-Newtonian inkjet ink is increased by at least 5% over a comparative inkjet ink printed from the same inkjet printer on the same recording media with the same print coverage.

11. The orthogonal non-Newtonian inkjet ink of claim 1, wherein the dynamic viscosity is 50 cps to 1000 cps at shear rate of 100 $s^{-1}$ and a temperature of 25° C., and is 1 cps to 25 cps at a shear rate of 10,000 $s^{-1}$ and a temperature of 25° C.

12. A method of printing a orthogonal non-Newtonian inkjet ink, comprising:

shearing the orthogonal non-Newtonian inkjet ink of claim 1 within a printhead of an inkjet printing apparatus at a shear rate of at least 10,000 $s^{-1}$ to provide a dynamic viscosity ranging from 1 cps to 50 cps, or heating the orthogonal non-Newtonian inkjet ink to a temperature of at least 50° C. to provide the viscosity ranging from 1 cps to 50 cps; and ejecting droplets of the orthogonal non-Newtonian inkjet ink.

13. A method of manufacturing an orthogonal non-Newtonian inkjet ink, comprising:

forming a metal oxide dispersion which includes a mixture of metal oxide, water, a first organic solvent, and a first salt;

forming an organic solution which includes a low molecular weight organic gelator, water, a second organic solvent, and a second salt; and mixing the metal oxide dispersion and the organic solution under a shear rate ranging 5 $s^{-1}$ to 100 $s^{-1}$ to form the orthogonal non-Newtonian inkjet ink.

14. The method of claim 13, further comprising the step of heating the orthogonal non-Newtonian inkjet ink to form a homogenous mass or gel, or heating one or both of the metal oxide dispersion or the organic solution prior to mixing to form a homogenous mass or mass upon mixing.

15. The method of claim 13, further comprising mixing a colorant therein.

* * * * *